United States Patent [19]
Norris

[11] Patent Number: 5,557,748
[45] Date of Patent: Sep. 17, 1996

[54] DYNAMIC NETWORK CONFIGURATION

[75] Inventor: David Norris, Portland, Oreg.

[73] Assignee: Intel Corporation, Santa Clara, Calif.

[21] Appl. No.: 383,254

[22] Filed: Feb. 3, 1995

[51] Int. Cl.$^6$ ................................................. G06F 13/00
[52] U.S. Cl. ............... 395/200.10; 395/821; 395/200.11; 395/200.12; 395/284; 364/229.4; 364/DIG. 1
[58] Field of Search ............................ 395/200.1, 200.2, 395/200.4, 200.6, 200.7, 200.11, 200.10, 200.12, 200.20, 821, 284, 575, 325, 700; 370/13, 17

[56] References Cited

U.S. PATENT DOCUMENTS

| | | | |
|---|---|---|---|
| 4,864,492 | 9/1989 | Blakely-Fogel et al. | 395/54 |
| 5,101,402 | 3/1992 | Chiu et al. | 370/17 |
| 5,109,484 | 4/1992 | Hughes et al. | 395/200.1 |
| 5,408,618 | 4/1995 | Aho et al. | 395/325 |
| 5,430,793 | 7/1995 | Ueltzen et al. | 379/98 |
| 5,446,874 | 8/1995 | Waclawsky et al. | 395/575 |
| 5,454,078 | 9/1995 | Heimsoth et al. | 395/200.01 |
| 5,459,713 | 10/1995 | Curtis | 370/13 |
| 5,490,276 | 2/1996 | Doli, Jr. et al. | 395/700 |
| 5,493,689 | 2/1996 | Waclawsky et al. | 395/821 |
| 5,499,343 | 3/1996 | Pettus | 395/200.02 |
| 5,500,934 | 3/1996 | Austin et al. | 395/755 |
| 5,509,123 | 4/1996 | Dobbins et al. | 395/200.15 |

*Primary Examiner*—Christopher B. Shin
*Attorney, Agent, or Firm*—Blakely, Sokoloff, Taylor & Zafman

[57] ABSTRACT

A dynamic network configuration in a computer records and analyzes network transactions to permit dynamic configuration of network parameters when connecting the computer to a network. Upon initial connection of the computer to the network, user preferences and network parameters for other locations previously encountered are read or entered into memory of the computer. The dynamic network configuration gathers network traffic data by entering a learn or promiscuous mode to record a number of network transactions for a predetermined time period. The network traffic data is indexed for analysis to determine the participants. The current participants are compared with the existing participants for previously observed locations. If a match occurs, then the network parameters are utilized to configure a protocol stack.

20 Claims, 4 Drawing Sheets

DYNAMIC NETWORK CONFIGURATION

FIELD OF THE INVENTION

The present invention relates to networking computer systems, and more particularly to dynamically configuring a network configuration of a computer.

BACKGROUND OF THE INVENTION

Computer systems have numerous applications for operation over a network. In order to interface a computer system to a network, several network parameters, which are specific for the network and the computer system, are set. Typically, computer systems, such as desk-top computer systems, are statically configured to operate over a particular network. The network parameters are statically configured in that the parameters are set once and are not changed. Computers systems are typically licensed to support one protocol stack for operation in a particular networking environment. Consequently, the static configuration of network parameters supports the licensing of network software such that a computer system is typically licensed for only one protocol stack.

In general, mobile computer devices are portable computers that are typically transported for use in more than one location. Mobile computer devices include, to name a few, notebook computers, laptop computers, and personal digital assistants. Because mobile computer devices are easy to transport, these devices are often used in several locations, and connected to different networks in the different locations. Although the static configuration of network parameters supports a computer that is configured to operate over a single network, the static configuration of network parameters does not effectively support mobile computer devices.

Today, in order to interface the mobile computer device to a new network, the user seeks out a network administrator or knowledgeable user to obtain sufficient information to install the computer device onto the network. For certain networking environments, a long list of detailed information is required to configure the device. For example, in the Transmission Control Protocol/Internet Protocol (TCP/IP) networking environment, a user is typically required to provide an IP address, a gateway address, a subnet mask, broadcast type, printer server, file server, authentication server, etc.

For the Novell NetWare™ environment, less information is required to configure the computer for the network. However, the potential for error when configuring network parameters is still very high. For example, the user must specify a packetization format such as an Institute of Electrical and Electronics Engineers (IEEE) 802 formatted packets or Ethernet II formatted packets.

Furthermore, the information required to configure the mobile o computer is typically meaningless to the user because the user typically only wants to use the printer or server. Therefore, the user does not have a reason to know all the network parameters. However, if all of the parameters are not set correctly, unknown network malfunctions will occur. Because of the static configuration of network parameters utilized today, computer devices do not address the problems encountered when using a computer, such as a mobile computer, on different networks having different network environments. Consequently, it is desirable to dynamically configure network parameters when a user connects to a particular network.

SUMMARY OF THE INVENTION

By observing network transactions, a computer subsystem can create a dynamic network configuration. In operation, the user connects a computer system, such as a mobile computer device, configured in accordance with the present invention to a particular network node on a network. The network location is not known to the initialization software of the mobile computer device. Upon initial connection of the mobile computer device to the network, user preferences and network parameters for other locations are read or entered into memory of the computer system. The dynamic network configuration gathers network traffic data by entering a learn or promiscuous mode to record a number of network transactions for a predetermined time period. In addition, the dynamic network configuration generates proactive commands.

The network traffic data is indexed for analysis. In one embodiment, the traffic data is indexed to disclose the participants as well as the volume, latency, and a time stamp for the corresponding transactions. The dynamic network configuration evaluates the indexed traffic data using volume, participants, protocol and latency criteria. Utilizing the indexed traffic data, a default router, a printer, a local server, and other client nodes observed on the network are determined to generate a current participants list.

The current participants list is compared with the existing participants for previously observed locations. If a match occurs, then the user is prompted to verify that the location is correct. If the user confirms the location, then the network parameters are utilized to configure a protocol stack. However, if no matches are found between the current participants list and the existing participants lists, then the user is prompted to enter a new location. Although the user is require to enter network parameters for the new location, certain network parameters are determined from the indexed network traffic data.

Other features and advantages of the present invention will be apparent from the accompanying drawings, and from the detailed description that follows below.

BRIEF DESCRIPTION OF THE DRAWINGS

The features, and advantages of the present invention will be apparent from the following detailed description of the preferred embodiment of the invention with references to the following drawings.

DETAILED DESCRIPTION

COMPUTER SYSTEM OVERVIEW

Figure 1:
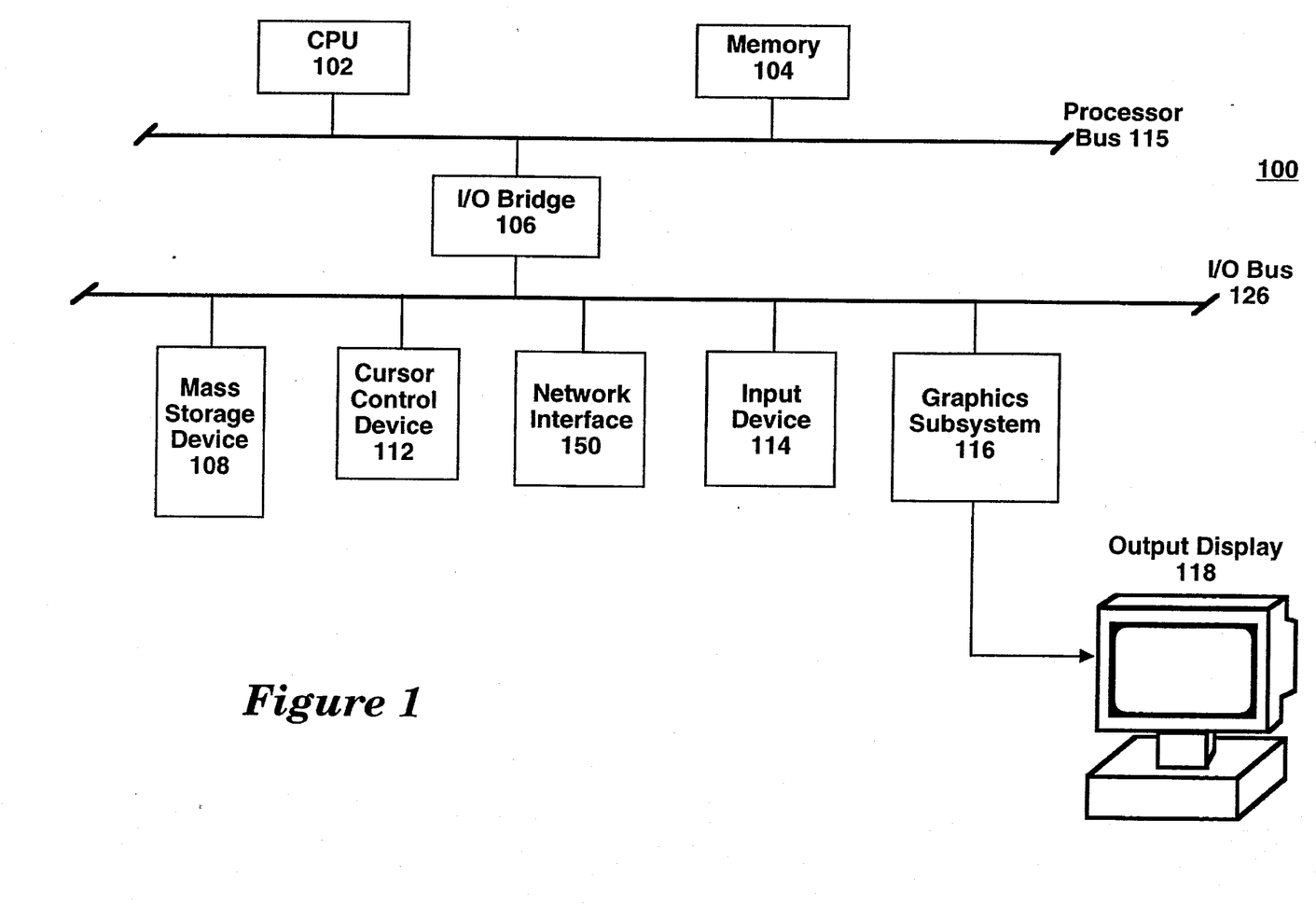
FIG. 1 illustrates a high level diagram of a computer system configured to operate in accordance with the dynamic network configuration of the present invention.

FIG. 1 illustrates a high level diagram of a computer system configured to operate in accordance with the dynamic network configuration of the present invention. A computer system 100 contains a central processing unit (CPU) 102 and a memory 104, coupled via a processor bus 115. In one embodiment, the CPU 102 is an Intel® architecture microprocessor, manufactured by Intel® corporation, the assignee of the present invention. The memory 104 may comprise dynamic random access memory (DRAM) as well as cache memory. The processor bus 115 is utilized to transfer data between the CPU 102 and the memory 104.

The computer system 100 also contains an input/output (I/O) bus 125. For example, the I/O bus 126 may comprise an industry standard association (ISA) bus or a peripheral component interconnect (PCI) bus. A mass storage device 108, cursor control device 112, and input device 114, are coupled to the I/O bus 126. The input device 114 may comprise a keyboard, a pen based input system or other well known devices for entering information into a computer system. In order to display data, the computer system 100 contains a graphics subsystem 116 and an output display 118. The graphics subsystem 116 contains hardware required to drive the output display 118. The mass storage device 108, cursor control device 112, graphic subsystem 145, output display 118 and input device 114, are those I/O devices typically found contained within a computer system, and these devices are intended to represent a broad category of I/O peripheral devices, which are well known in the art and will not be described further.

The processor bus 115 is coupled to the I/O bus 126 via an I/O bridge 106. The I/O bridge 106 provides functionality to allow the CPU 102 to interface to the I/O devices contained on the I/O bus 126. For example, the I/O bridge 106 may comprise an I/O bus arbiter and an I/O bus controller. Although the computer system 100 is shown as having a processor bus 115 and an I/O bus 126 coupled via an I/O bridge 106, the CPU 102 and memory 104 may be coupled to the I/O devices by any means. The CPU 102, memory 104, processor bus 115, I/O bridge 106, and I/O bus 126 are intended to represent a broad category of data processing devices which are well known in the art and will not be described further.

The computer system 100 further includes a network interface 150. In general, the network interface 150 operates in conjunction with software stored in memory 104 to interface the computer system 100 with a network. As is explained more fully below, in one embodiment, the dynamic network configuration of the present invention is implemented in the network interface 150 under software control. Although the present invention has general applicability in computer devices, a mobile computer or home based computer for telecommuting device is described in a preferred embodiment below.

DYNAMIC NETWORK CONFIGURATION

Figure 2:
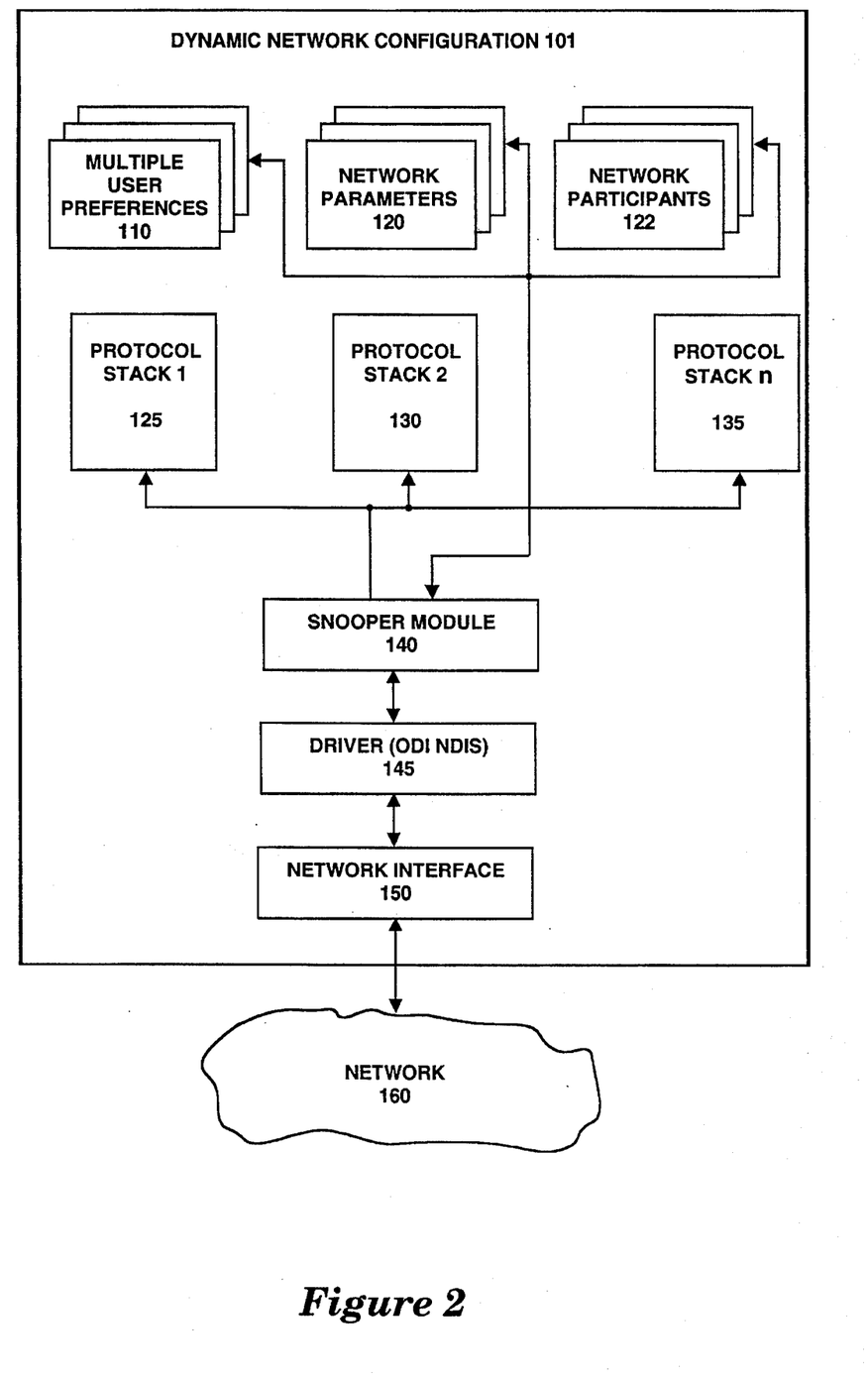
FIG. 2 illustrates a network configuration for a dynamic network configuration configured in accordance with the present invention.

FIG. 2 illustrates a network configuration for a dynamic network configuration 101 configured in accordance with the present invention. The dynamic network configuration 101 is configured to support a number of network protocols. More specifically, the dynamic network configuration 101 includes a plurality of network protocol stacks (1–n) 125, 130 and 135. For each network protocol, the dynamic network configuration 101 contains a separate protocol stack. For example, the network protocol stack 125 may be configured to support TCP/IP, the network protocol stack 130 may be configured to support Banyan™ protocol, and the network protocol stack 135 may be configured to support Novell™ NetWare™. The above mentioned network protocols are not restrictive in that the dynamic network configuration 101 may be configured to support any network protocol without deviating from the spirit and scope of the invention.

The dynamic network configuration 101 also includes multiple user preferences 110. For each network protocol stack, the dynamic network configuration 101 contains at least one user preference 110. Each user preference 110 for a corresponding network protocol stack defines network parameters for a particular location (e.g. the multiple user preferences 110 define network parameters for a particular network and a particular location on that network). Multiple user preferences 110 that correspond to a single protocol stack permit the dynamic network configuration 101 to readily dynamically configure based on the particular location on the network. The operation and use of multiple user preferences 110 for dynamically configuring the network parameters is described more fully below.

As shown in FIG. 2, the dynamic network configuration 101 is coupled to a network 160. In order to interface the dynamic network configuration 101 to the network 160, the dynamic network configuration 101 contains a driver 145 and a local area network (LAN) interface 150. The driver 145 provides an interface to the hardware layer, and may be configured to support any interface. For example, the driver 145 may be configured in accordance with an open datalink interface (ODI) for Novell™ or a network device driver interface specification (NDIS). The operation of a software driver, such as driver 145, to interface a computer device to the physical layer of a network is well known in the art and will not be described further. Similarly, the network interface 150 is intended to represent a broad category of network interface devices that support a promiscuous or learn mode. For example, the network interface 150 may be configured for Ethernet™ or Token Ring such that both network environments support a promiscuous mode.

In order to implement the present invention, the dynamic network configuration 101 contains a snooper module 140. As shown in FIG. 2, the snooper module 140 communicates with multiple user preferences 110, network parameters 120, network participants 122, as well as each protocol stack 125, 130, and 135. In addition, the snooper module 140 is coupled to the driver 145 to provide an interface to and from the driver 145. In general, the snooper module 140 determines the network parameters for the particular network location of the computer system by observing traffic on the network 160.

As is described more fully below, the network interface 150 and the snooper module 140 operate in a learn mode. In general, the snooper module 140 determines network parameters to configure a protocol stack for the network environment at the current location. Specifically, the snooper module 140 determines the location of the computer device, and then configures the protocol stack, based on the networking environment and user preferences, for the location determined. The snooper module 140 permits dynamic configuration of network parameters with minimal user interaction.

As a particular computer device is connected and configured for various networks, the dynamic network configuration 101 retains information about each location. The dynamic network configuration 101 includes a user interface that permits a user to identify a particular network location by name. For example, if a user is connected to the network on the first floor of the main office, the user may designate this location as "Home Office: First Floor" to identify the network location.

For each identified network location, the dynamic network configuration 101 stores associated network parameters in the network parameters area 120 (FIG. 2). Therefore, once the computer device is configured for operation on a particular network location, the dynamic network configuration 101 stores the network parameters for that location.

The dynamic network configuration 101 also includes network participants data 122. In general, the dynamic network configuration 101 stores a list of network participants in the network participants data 122 area for each network location previously encountered by that particular mobile computer device. For each set of network parameters in the network parameters area 120, the dynamic network configuration 101 stores network participants in the network participants 122 area. Table 1 depicts an example of a network participants list configured in accordance with one embodiment of the present invention.

TABLE 1

| Location | Participants |
| --- | --- |
| Home Office (First Floor) | Local Server (Addr) |
| | Printer (Addr) |
| | Server 2 (Addr) |
| | Router (Addr) |
| Home Office (Second Floor) | Local Server (Addr) |
| | Printer 1 (Addr) |
| | Printer 2 (Addr) |
| | Client 1 (Addr) |
| Branch Office | Local Server (Addr) |
| | Printer (Addr) |

In one embodiment, the network participants lists stored in the network participants 122 area contains, for each network location, a list of network devices. The list of network devices identifies nodes that conduct network transactions visible at the network location. For example, the network participants list for a particular network location identifies the local server by address for that particular location or network segment. In a preferred embodiment, the network participants list also includes information pertaining to the volume of network transaction for a network participant, the latency of the network transactions, and a time stamp. The time stamp identifies the time of day that the network transactions occurred to further qualify the volume and latency data. In addition, the network participants list further identifies the predominant network protocol observed on that particular location.

OBSERVING NETWORK TRANSACTIONS

Figure 3:
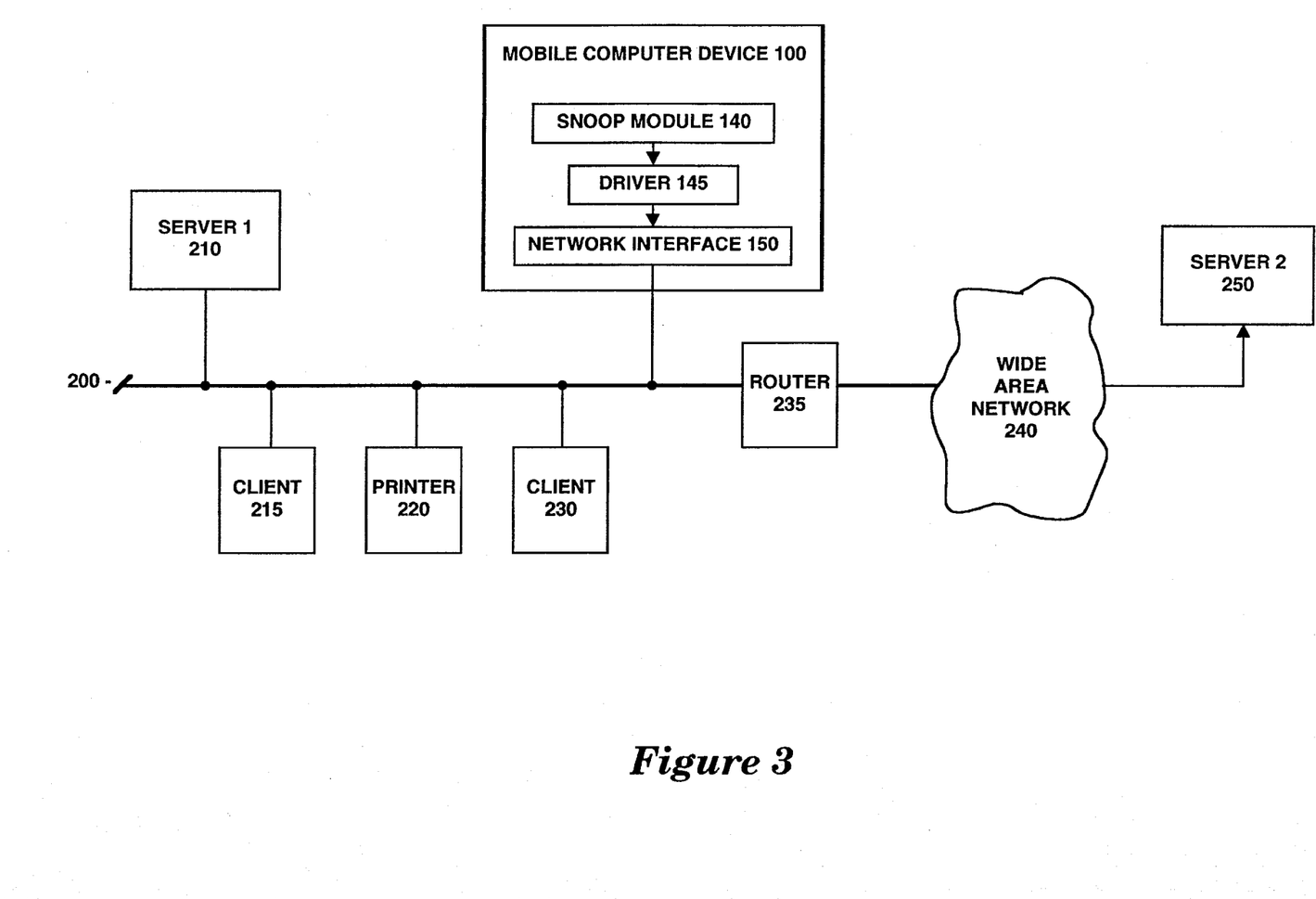
FIG. 3 is a high level block diagram illustrating an example network including a portion of the mobile computer device configuration of the present/invention.

FIG. 3 is a high level block diagram illustrating an example network including a portion of the dynamic network configuration 101 of the present invention. As shown in FIG. 3, a mobile computer device 100 that includes the dynamic network configuration 101 is coupled to the network 200. Also coupled to the network 200 is a first server 210, a client 215, a printer 220, and a client 230. Furthermore, a router 235, coupled to the network 200, couples a wide area network 240 and a second server 250 to the network 200. The network 200 illustrated in FIG. 3 is provided for purposes of explanation, however, any network configuration is applicable to the teachings of the present invention.

When the mobile computer device 100 is initially connected to the network 200, the snooper module 140 and the network interface 150 operate in conjunction to observe transactions occurring on the network 200. Specifically, the snooper module 140 and the network interface 150 enter a "snoop mode" or a "promiscuous mode". In order to enter the snoop or promiscuous mode, the network interface 150 is configured such that the network interface 150 receives all transactions that occur on the network 200. The operation of the network interface 150 to snoop the network 200 is similar to the operation of a bus controller that snoops a digital bus. In one embodiment, the snooper module 140 and the network interface 150 enter the snoop or promiscuous mode for approximately sixty (60) seconds.

During operation in the snoop mode, the snooper module 140 records the transactions received from the network interface 150 via the driver 145. Initially, the snooper module 140 gathers traffic data that includes raw data of network transactions observed on the network 200. For example, the snooper module 140 and the network interface 150 may observe a high volume of transactions involving the server 210. In response, the snooper module 140 records information for each transaction observed on the network 200. In one embodiment, the snooper module 140 decodes network packets to determine the participants involved in the transaction, the latency of the transaction, the protocol type of the data packets, and the time that the transaction occurred. In order to record participants data for network transactions, the snoop module 140 decodes both the media/medium access control (MAC) 12 digit address, and the network address.

In order to determine specific network devices on the network 200, the traffic data are indexed. In one embodiment, the indexed traffic data contains fields, for each transaction, including a participants field, a latency field and a time stamp field. In addition, after recording all network transactions, the number of transactions between common participants is compiled to generate a volume field. Table 2 below illustrates one embodiment for indexing the network traffic data in accordance with the present invention.

TABLE 2

| Volume | Participants | Latency | Time of Day |
| --- | --- | --- | --- |
| 20 packets | Node 1 to Node 2 | 10 msec | 10:00 AM |
| 20 packets | Node 2 to Client 1 | | |
| 5 packets | Node 3 to Node 4 | | |
| 1 packet | Node 4 to Node 3 | | |
| 5 packets | Node 3 to Node 2 | | |
| 5 packets | Node 2 to Node 3 | | |

As discussed above, the snoop module 140 decodes both the MAC hardware address and the network address for each transaction. Each decoded MAC address is assigned a node number. For example, the snoop module 140 may observe, after decoding the MAC addresses, a transition involving two participants (i.e. a point to point transaction). For this example, the snoop module 140 assigns a "node 1" designation for the first point and a "node 2" designation for the second point. For subsequent transactions observed on the network 200, the snoop module 140 decodes MAC addresses, and compares the decoded MAC addresses with the existing node designations to maintain consistency in he node designation.

For the example illustrated in Table 2, four nodes were observed during the learn or promiscuous mode. In general, the participants field identifies the two participants in a point to point transaction. For a broadcast transaction on the network 200, the participants field includes the originator of the broadcast message and all destination participants. The latency field indicates the propagation delay time for a corresponding transaction (e.g. 10 milliseconds (msec) for the transaction). Also, for each transaction, the time stamp field indicates the time of day the network transaction occurred.

Transactions between any two nodes are listed in the participants column (e.g. node 1 to node 2, node 2 to node 1, etc.). In addition to listing all the participants, the volume of transactions associated with participants is indicated. For the example of Table 2, the node 1 to node 2 transaction involved a transfer of 20 packets. In addition, latency information is provided for each transaction. Because the transaction may involve transfer of several data packets, an average latency is derived for a particular transfer between the two associated participants. For the example in Table 2, a ten millisecond (msec) time elapse is recorded for transactions between node 1 and node 2.

The time stamp indicates the time of day a particular transaction was observed. For the network traffic data being observed for the current location, the time stamp indicates approximately the same time. However, the information is useful when comparing the current network traffic data with previously stored network traffic data. Other information for the network traffic data, such as the protocol type, may be recorded. An example of recording the protocol type is described below in conjunction with a discussion of Table 3.

CRITERIA FOR DETERMINING NETWORK CONFIGURATION

The present invention utilizes several different types of criteria to determine the network configuration for the mobile computer device 100. In a preferred embodiment, the present invention utilizes a combination of participant, volume, and latency criteria to determine network devices and the network location for the mobile computer device 100. As is explained more fully below, a time stamp criteria is used to qualify traffic data with an existing data stored in the network participants 122 area. In addition, a protocol analysis is used to determine a particular segment on the network.

In a networking environment, a high volume of one to many transactions tends to indicate that the one participant is a server or a router. By analyzing a one to many transactions contained within the indexed traffic data for a network, the local server is determined. For example, the client 215, printer 220, and source packets, routed through router 235, may all address the server 210. In the Novell™ environment, a local server is designated, and the server receives a high volume of transactions from multiple nodes. Because the environment is based on the server being local, detecting such a one to many transactions indicates that the server is local to the same segment that the mobile computer device 100 is attached. Therefore, by viewing the high volume of a point to point transaction and by decoding the MAC address, the snooper module 140 determines that many clients are communicating with a single server.

Because of the usual operation of a router in a network environment, a network may exhibit a high volume of transactions to a router. For the network example illustrated in FIG. 3, the network 200 may exhibit a high volume of transactions to the router 235. For a high volume point to point transaction, the snooper module 140 decodes both the MAC hardware address and the network address for each packet. If the network destination addresses differ between packets for a point to point transaction, then one of the devices in the transaction is a router. If the high volume point to point transactions are between, for example, the router 235 and the client 215, then the destination address, within the network portion of the address, identifies different devices. Therefore, the snooper module 140 determines that the network device identified at the particular physical address is a router such that the router 235 is acting for "n" nodes.

Although a particular computer device may observe many network participants at a particular location, determining the local segment of the current location to configure the network parameters is required. In one embodiment, the mobile computer device 100 utilizes latency data to determine the network participants on a particular local segment. The mobile computer device 100 ascertains the subnet mask by parsing the IP packet headers. In the Novell NetWare™ networking environment, the local file server receives substantially more traffic than other nodes. Therefore, in the NetWare™ environment, the NetWare™ file server communicates with many different nodes that are only communicating with that NetWare™ file server. In addition, the NetWare™ file server only responds to requests such that the NetWare™ file server does not initiate requests.

When comparing traffic data for the current location with network participants in stored locations, the determination of the current segment must be considered. For example, in the network participants for a particular location, transactions occur from network participants outside the segment. To determine whether the current segment is the same segment as the segment in the stored location, the present invention analyzes the volume of transactions to the server to ascertain that the server is local. In addition, using proactive checks, the snoop module 140 determines that higher latency responses result from servers not contained within the segment, and lower latency responses occur with local servers. Therefore, by comparing the latency data of the network participants in the stored locations with the latency data of the indexed traffic data, the current segment for the network location is determined.

In the TCP/IP networking environment, IP addresses are grouped such that the first part of the IP address identifies a particular segment. (e.g. the first six digits). Consequently, if the indexed network traffic data contains participants with similar IP addresses (e.g. same first six digits) then the method determines that these clients are on the same segment.

In addition to the above criteria, the present invention utilizes a protocol analysis to determine the segment of the current location. Table 3 illustrates an example of protocol analysis for the present invention.

TABLE 3

| Location | Novell ™ | Banyan ™ | IP |
|---|---|---|---|
| Home Office (First Floor) | 80% | 5% | 15% |
| Branch Office 1 | 5% | 80% | 15% |
| Branch Office 2 | 5% | 5% | 90% |

For the example illustrated in Table 3, a home office on the first floor, and two branch offices are the locations. In the home office, 80% of transactions are occurring on the network are the Novell NetWare™ type, 5% are the Banyan™ type and, 15% are formatted in accordance with the TCP/IP protocol. Based on this data, the present invention determines that the local segment (the home office on the first floor) is formatted with Novell NetWare™ packets. For the branch office 1, the present invention determines that the local segment utilizes a Banyan™ protocol, and the branch office 2, with 90% IP packets, utilizes the TCP/IP networking environment. The protocol analysis is also used to set the network environment for selecting the proper protocol stack.

In addition to the participants criteria, the snooper module 140 utilizes the volume of traffic on the network 200 to determine the mobile computer device 100 location. For example, if the snooper module 140 observes a high volume of one to one transactions, then the server 210 to printer 220 transaction may be occurring. As discussed above, a high volume of a one to many transaction tends to indicate that the one participant is a server or a router. Therefore, for the network example of FIG. 3, a high volume observation of both one to many and point to point transactions occurring on the network 200 tends to identify the server 210 or router 235. Note that although a router may exhibit a high volume of one to one transactions, routers are identified based on observing one to many transactions.

In addition to participants and volume criteria, the snooper module 140 of the present invention utilizes latency criteria to identify the location and subsequently network configuration parameters for the mobile device 100. The snooper module 140 of the present invention may utilize several techniques to determine latency in a network transaction. In a preferred embodiment, in order to determine latency from the mobile computer device 100 to the server 210, the snooper module 140 generates proactive commands to query the local server. For example, in the TCP/IP environment, innocuous commands "PING/ARP" are provided to generate requests to other network devices. Therefore, as part of the learn mode, the snooper module 140 generates innocuous commands, and measures the latency for response to these commands.

The snooper module 140 stores the latency data for the various requests made in the latency field of indexed traffic data. If the snooper module 140 requests a response from two separate servers, and the first server responds with much greater latency, then the first server is connected via an intra-structure device, such as a router. In a known network system environment, a user may request up to nine such servers to determine latency for each server.

The latency measured for any particular network device varies depending upon the time of day because networks exhibit different amounts lo of traffic for different times of the day. For example, during the peak work hours, high volumes of traffic, particularly between the server and printers, may be exhibited in a particular network environment. In the early evening hours, the network may be experiencing a back up such that many transactions between network nodes and the server are occurring.

Although different times of the day result in different measurements for network transaction latencies, the measurements are useful as a relative measure. For example, in comparing the latency of two servers, both servers may exhibit a greater latency at peak network transaction times. However, the first server still exhibits a greater latency than the second server. Therefore, when storing latency data, both a time stamp, indicating the time of day, and the latency measured are stored. The snooper module 140 calculates the relative latencies based on this data (e.g. first server, fastest, second server, next fastest, etc.).

In practice, the time stamp associated with latency data is often very relevant. The relevance of the time stamp is based on the typical action of the user that connects a mobile computer device onto the network. For example, a user of a mobile computer device that is visiting an offsite location may often access the network at the same time. For example, a user of the mobile device may tend to connect to the network at 9:00 AM, even though the user is working at a different location. For such a user that connects to the network at similar times, the latency data is more accurate because the traffic on the network may be similar at that time of day.

In addition to the SAP/ARP proactive commands, the snooper module 140 may utilize a DHCP request when operating in the TCP/IP environment. The DHCP command obtains information from the local server, and partially configures the corresponding protocol stack. The dynamic network configuration 101 may also utilize a variety of well-known self configuration protocols to determine the networking environment. For example, the dynamic network configuration 101 may use a RARP, BOOTP or DHCP commands. Any information obtained from these commands may be utilized to refine the network configuration parameters or as criteria for determining network configuration.

However, the prior art commands are limited because these commands assume a particular protocol family, such as NetWare™ or TCP/IP is known. However, using the methods and techniques of the present invention to determine the protocol family, the proactive commands may be utilized to determine certain network parameters. The ARP and SAP commands are used to locate a variety of hardware mechanisms on the network. This permits the mobile computer to connect to a quiet network or a completely foreign network and still utilize resources on that network.

The snooper module 140 may also utilize rules for network configuration. The rules for network configuration, if used, are specific for a particular network management scheme or company policy. In general, network configuration rules include rules for assigning logical addresses to devices based on the type of the device. The rules for network configuration may include specifying a range of addresses for a network device and specifying the length of a particular field. For example, the default router may have an IP address of 251, and all subnet masks are 24 bits in length. For a network environment implementing such rules, if the IP address of a network device is 251, then the snooper module 140 determines that the network device is the default router. The use of network configuration rules simplifies the process of determining the type of a network device.

OPERATION OF THE PREFERRED EMBODIMENT

Figure 4:
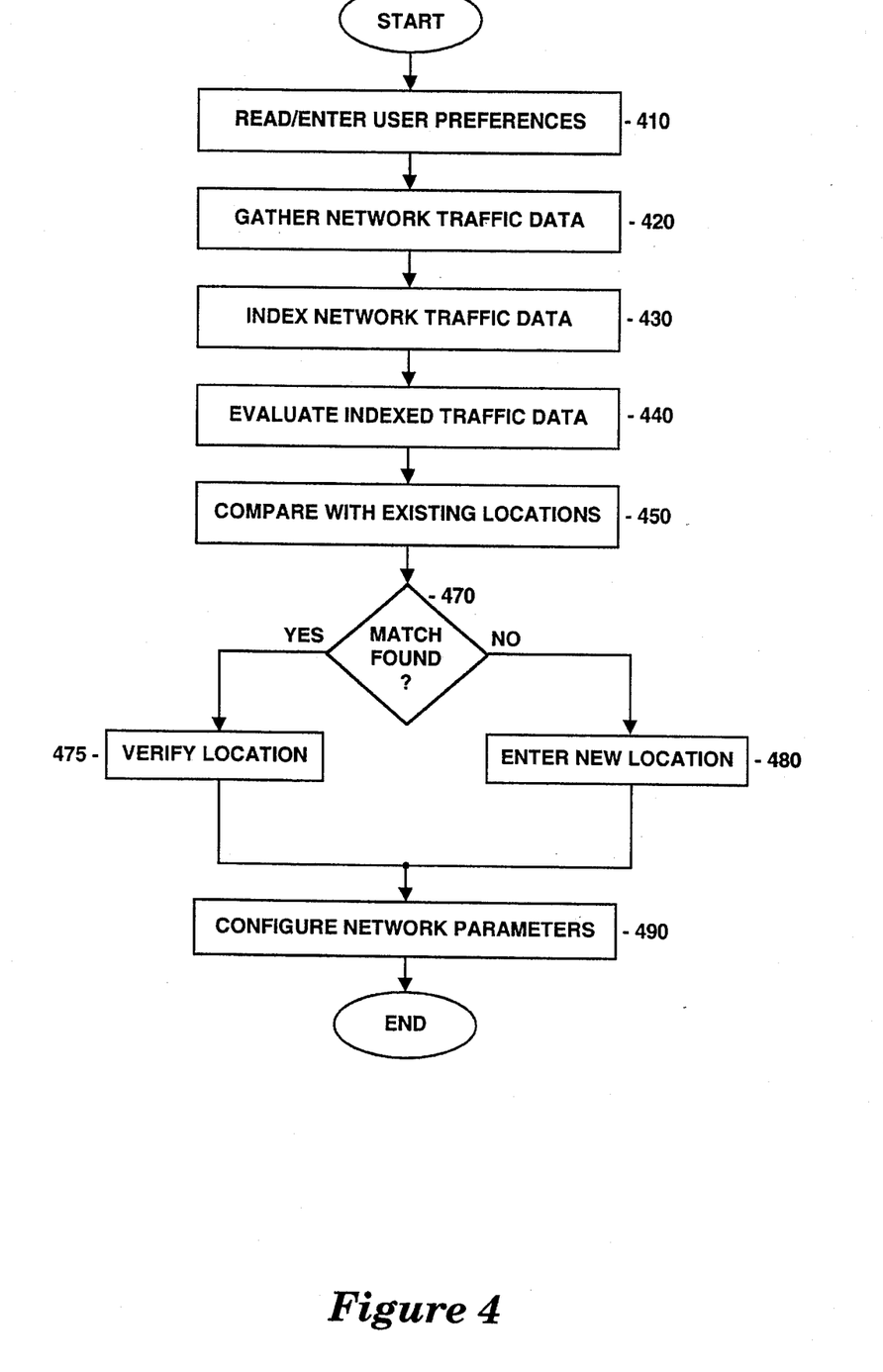
FIG. 4 is a flow diagram illustrating the high level method of dynamically configuring network parameters.

FIG. 4 is a flow diagram illustrating the high level method of dynamically configuring network parameters. The operation is initiated when the user connects a mobile computer device configured in accordance with the present invention to a particular network node on a network. The network location is not known to the protocol stack of the mobile computer device. Upon initial connection of the mobile computer device to the network, the user preferences and network parameters for other locations are read or entered into memory of the mobile computer device 100 as shown in step 410. As shown in block 420, the snooper module 140 gathers network traffic data. In order to gather the network traffic data, the snooper module 140 enters the learn or promiscuous mode to record a number of network transactions for a predetermined time period. In addition, the snooper module 140 generates the proactive commands.

As shown in block 430, the network traffic data is indexed for analysis. In one embodiment, the traffic data is indexed to disclose the participants as well as the volume, latency, and a time stamp for the corresponding transactions as shown in Table 3 above. The method of the present invention then evaluates the indexed traffic data as shown in block 40 in FIG. 4. In general, as discussed above, the indexed traffic data is evaluated using volume, participants, protocol and latency criteria. Utilizing the indexed traffic data, a default router, a printer, a local server, and other client nodes observed on the network are determined to generate a current participants list. In addition, the segment is determined by ascertaining the local server. By evaluating the indexed traffic data, a list of participants is generated including identifying participants on the local segment.

As shown in block 450, the current participants list is compared with the existing participants for previously observed locations. For example, the method compares the local server for the current segment with the address of local servers contained on existing participants lists. If a match occurs, then the user is prompted to verify that the location is correct as shown in step 470 and 475. For example, if the current participants list contains the same local server as a location list for the branch office 1, then the mobile computer device asks the user whether the user is plugged into the network at the branch office 1 location. If the user confirms the location, then the network parameters stored in the network parameters 120 area for the branch office 1 location are utilized to configure a protocol stack. However, if no matches are found between the current participants list and the existing participants lists, then the user is prompted to enter a new location as shown in step 480. Although the user is require to enter a network parameters for the new location, certain network parameters may still be determined from the indexed network traffic data.

In step 490, the network parameters are configured. The determination of specific network parameters to configure the mobile computer device is dependent upon the particular networking environment. For example, in the TCP/IP networking environment, setting the network parameters include specifying a default router, an IP address, a subnet mask, a broadcast address, a preferred server, a preferred printer, and the protocol type. As discussed above, the default router is determined based on the participants list for the current location. The IP address, specific for the particular user, is obtained from a network administrator. Because the IP address is unique to the mobile computer device, the IP address is entered by the user. However, a portion of the IP address is determined from other clients or nodes contained on the same segment. The subnet mask is derived from the IP address to determine a network ID, subnet ID, host ID, etc. The broadcast address is typically either 00.00.00.00 or FF.FF.FF.FF. hexadecimal. Both the preferred server and preferred printer are derived from the current participants list. The protocol type, IP, Banyan™ or NetWare™ is determined from the protocol analysis discussed above.

The configuration of network parameters step can be implemented by modifying existing network configuration files like "net.cfg" for ODI drivers or "protocol.ini" for NDIS drivers. These standardized files contain configuration information that various protocol stacks require. All of the network parameters determined may require setting in these files. Table 4 below provide an example of a "net.cfg" file. Items that may require change are bold. The format and content of these files is well known in the art and will not be described further.

TABLE 4

| File Name | Parameters |
| --- | --- |
| Protocol EXP16ODI | Bind EXP16ODI |
|  | Sessions 8 |
| Link Driver EXP16ODI | Int 5 |
|  | Port 310 |
|  | frame Ethernet_II |
| Protocol TCPIP | ip_address 143.181.197.14 |
|  | ip_router 143.181.197.251 |
|  | ip_netmask 255.255.255.0 |
|  | tcp_sockets 8 |
|  | udp_sockets 8 |
|  | raw_sockets 1 |
|  | nb_sessions 4 |
|  | nb_commands 8 |
|  | nb_adapter 0 |
|  | nb_domain |

Command line options to certain network modules may also require change. For example, the/PS=preferred-server option for NetWare's NETX and VLM commands.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for dynamically configurating network parameters for a computer device coupled to a network, said method comprising the steps of:
   a) storing a plurality of network parameters and a plurality of network participants corresponding to at least one previous network location, said network participants identifying participants observed for said corresponding at least one previous network location;
   b) snooping on said network to observe network transactions occurring on said network;
   c) evaluating said network transactions to determine at least one network parameter, wherein the step of evaluating said network transactions comprises the step of generating a current network participants list based on said network transactions to identify at least one previous network location; and
   d) configurating said computer device with said at least one network parameters so as to dynamically configure said computer device based on said network transactions observed, wherein the step of configurating said computer device comprises the step of configurating said computer device with network parameters corresponding to said at least one previous location when said current network participants compares with said network device on said network participants.

2. The method as set forth in claim 1, wherein the step of generating a current network participants list comprises the steps of:
   a) indexing said network transactions observed to generate indexed traffic data that identifies at least one network device observed on said network; and
   b) evaluating said indexed traffic data to generate a current network participants list comprising at least one network device.

3. The method as set forth in claim 1, wherein the step of snooping on said network to observe network transactions further comprises the step of executing proactive commands.

4. The method as set forth in claim 1, wherein the step of generating a current network participants list comprises the step of utilizing volume of said network transactions as a criteria to identify a network device.

5. The method as set forth in claim 1, wherein the step of generating a current network participants list comprises the step of utilizing latency of said network transactions as a criteria to identify a network device.

6. The method as set forth in claim 1, wherein the step of generating a current network participants list comprises the steps of:
   analyzing said network transactions to determine a predominate network protocol; and
   identifying a local segment on said network based on said predominate network protocol utilized.

7. The method as set forth in claim 1, wherein the step of generating a current network participants list comprises the steps of:
   observing a high volume of one to many network transactions from a network device; and
   identifying said network device as a local server.

8. The method as set forth in claim 1, wherein the step of generating a current network participants list comprises the steps of:
   observing a high volume point to point transactions to a first network device that identifies different network devices as a final destination; and
   identifying said first network device as a default router for computer device.

9. The method as set forth in claim 1, wherein the step of generating a current network participants list comprises the steps of:

observing a high volume point to point transactions for a network device within a local segment; and identifying said network device as a printer for said computer device.

10. The method as set forth in claim 1, wherein the step of generating a current network participants list comprises the steps of:

decoding each network transaction to determine a source participant and at least one designation participant; and designating a single entry in said participant list, for each transaction between said source participant and said at least one designation participant.

11. The method as set forth in claim 1, wherein the step of configuring said computer device further comprises the steps of:

prompting a user of said computer device to verify that said computer device is located at said previous network location when said current network participants compares with at least one network device on said network participants; and storing said current network participants as network participants and storing corresponding network parameters including identifying a new location when said current network participants does not compare with at least one network device on said network participants list.

12. A method for dynamically configuring network parameters for a computer device coupled to a network, said method comprising the steps of:

a) storing a plurality of network parameters and a plurality of network participants corresponding to at least one previous network location, said network participants identifying participants observed for said corresponding previous network location;

b) snooping on said network to observe network transactions occurring on said network to generate traffic data comprising;

c) indexing said traffic data to generate indexed traffic data that identifies at least one node observed on said network;

d) evaluating said indexed traffic data to generate a current network participants list comprising at least one current network participant that identifies said at least one node as a network device;

e) comparing said current network participants list with said network participants for said at least one previous network location; and f) configuring said computer with network parameters corresponding to said at least one previous network location when said current network participants compares with said network device on said network participants.

13. A computer system that dynamically configures network parameters when coupled to a network, said computer system comprising:

at least one central processing unit (CPU);

a memory coupled to said CPU, wherein said memory stores a plurality of network parameters and a plurality of network participants corresponding to at least one previous network location, said network participants identifying participants observed for said corresponding at least one previous network location; and a dynamic network configuration coupled to said CPU for snooping on said network to observe network transactions occurring on said network, for evaluating said network transactions to determine at least one network parameter, and for configuring said computer system with said at least one network parameters so as to dynamically configured said computer system based on said network transactions observed, said dynamic network configuration for generating a current network participants list based on said network transactions to identify at least one network device, and for comparing said current network participants list with said network participants for said at least one previous network location, and for configuring said computer system with network parameter corresponding to said at least one previous network location when said current network participants compares with said network device on said network participants.

14. The computer system as set forth in claim 13, wherein said dynamic network configuration indexes said network transactions observed to generate indexed traffic data that identifies at least one network device observed on said network, and evaluates said indexed traffic data to generate a current network participants list comprising at least one network device.

15. The computer system as set forth in claim 13, wherein said dynamic network configuration executes proactive but innocuous commands.

16. The computer system as set forth in claim 13, wherein said dynamic network configuration utilizes volume of said network transactions, latency of said network transactions as a criteria to identify a network device.

17. The computer system as set forth in claim 13, wherein said dynamic network configuration analyzes said network transactions to determine a predominate network protocol, and identifies a local segment on said network based on said predominate network protocol utilized.

18. The computer system as set forth in claim 13, wherein said dynamic network configuration:

identifies said network device as a local server when observing a high volume of one to many network transactions from a network device;

identifies a first network device as a default router for said computer system when observing a high volume point to point transactions to said first network device that identifies different network devices as a final destination; and identifies said network device as a printer for said computer system when observing a high volume point to point transactions for a network device within a local segment.

19. The computer system as set forth in claim 13, wherein said dynamic network configuration decodes each network transaction to determine a source participant and at least one designation participant, and designates a single entry in said participant list, for each transaction between said source participant and said at least one designation participant.

20. The computer system as set forth in claim 13, further comprising:

a user interface to prompt a user of said computer system to verify that said computer system is located at said previous network location when said current network participants compares with at least one network device on said network participants; and said memory for storing said current network participants as network participants and storing corresponding network parameters including identifying a new location when said current network participants does not compare with at least one network device on said network participants list.

* * * * *